United States Patent [19]

Barr et al.

[11] Patent Number: 5,541,781

[45] Date of Patent: Jul. 30, 1996

[54] METHOD FOR SYNCHRONIZING DIGITAL AUDIO TAPE RECORDERS

[75] Inventors: Keith Barr, Los Angeles; Alan Zak, Culver City; Marcus Ryle, Marina del Rey; David Brown, Los Angeles, all of Calif.

[73] Assignee: Alesis, Los Angeles, Calif.

[21] Appl. No.: 226,380

[22] Filed: Apr. 12, 1994

Related U.S. Application Data

[63] Continuation of Ser. No. 822,464, Jan. 17, 1992, abandoned.

[51] Int. Cl.⁶ ................................................. G11B 27/10
[52] U.S. Cl. ........................ 360/14.3; 360/70; 360/73.02
[58] Field of Search .............................. 360/14.3, 13, 15, 360/73.04, 73.02, 70

[56] References Cited

U.S. PATENT DOCUMENTS

| | | | |
|---|---|---|---|
| 4,210,939 | 7/1980 | Ninomiya et al. | 360/14.3 |
| 4,390,908 | 6/1983 | Nakamura et al. | 360/70 |
| 4,772,966 | 9/1988 | Sharples et al. | 360/13 |
| 4,991,032 | 2/1991 | Staffer et al. | 360/14.3 |

FOREIGN PATENT DOCUMENTS

| | | |
|---|---|---|
| 0368511 | 5/1990 | European Pat. Off. . |
| 2141284 | 12/1984 | United Kingdom . |

OTHER PUBLICATIONS

*Tape Recording and Reproduction*, A. A. McWilliams, 1964 Focal Press Limited NY, p. 232.
*The New Recording Studio Handbook*, John Woram & Alan Kefauver, 1990 Elar Publishing Co. NY, pp. 375–378.

SMPTE Journal, vol. 99, No. 7, Jul. 1990, White Plains, NY, US, pp. 542–553, XP000141733, Ueno et al "A Professional DAT System".

Patent Abstracts of Japan, vol. 15, No. 107 (P–1179) 14 Mar. 1991 & JP–A–02 312 090 (Mitsubishi Electric Co.) 27 Dec. 1990.

Patent Abstracts of Japan, vol. 10, No. 327 (P–513) 7 Nov. 1986 & JP–A–61 133 073 (Sony Corp.) 20 Jun. 1986.

Patent Abstracts of Japan, vol. 14, No. 183 (P–1035) 12 Apr. 1990 & JP–A–02 029 963 (Mitsubishi Electric Co.) 31 Jan. 1990.

*Primary Examiner*—Aristotelis Psitos
*Assistant Examiner*—James T. Wilson
*Attorney, Agent, or Firm*—Hecker & Harriman

[57] ABSTRACT

A method for synchronously operating two or more rotary head digital audio tape recorders without having to dedicate a separate timing track. The present invention synchronizes the machines in three steps. First, the slave unit reads the time code value from the data stream and compares this time code to the master's time code, examining the difference in time code values and adjusting the transport speed so that the values are approximately equal. Next, the slave's capstan motors are slowed down (or sped up) so that the slave and master units are within one drum revolution of each other. Finally, the slave's microprocessor adjusts the speed of the entire system to skip individual samples until the master and slave units are synchronized.

18 Claims, 8 Drawing Sheets

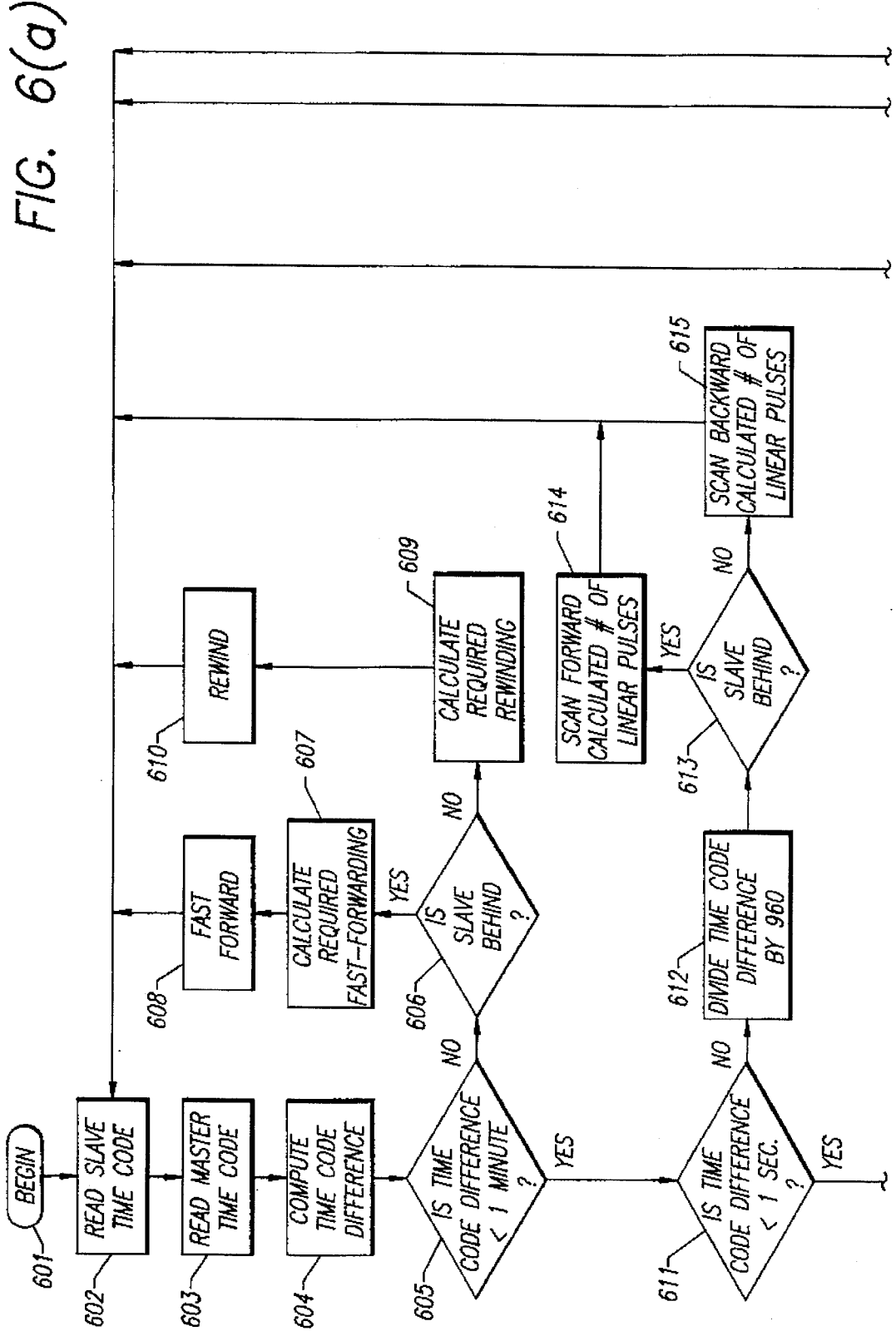

METHOD FOR SYNCHRONIZING DIGITAL AUDIO TAPE RECORDERS

This is a continuation of application Ser. No. 822,464 filed Jan. 17, 1992 now abandoned.

BACKGROUND OF THE PRESENT INVENTION

1. Field of the Invention

The invention relates to the field of digital audio recording and, more specifically, to a method for synchronously operating two or more digital audio tape recorders.

2. Description of the Prior Art

In professional digital audio applications, it is often desirable to be able to operate two or more rotary head digital audio recording machines synchronously. During synchronous operation, each recorder is precisely lined up on an exact sample per sample basis. Synchronous operation of multiple rotary head digital audio recorders permit a user to increase the number of available recording tracks by combining the multi-track capability of several recorders. Instead of requiring a more expensive sixteen track recorder, for instance, a user could synchronously operate two eight track rotary head recorders.

During synchronous operation, it is convenient to be able to operate the digital audio recorders in a variety of different modes of operation, such as playback, record, and high-speed scanning (both forward and backward). During normal operation, the rotary head is capable of detecting all of the information stored on the magnetic tape. However, in a high-speed scan, or "shuttle" mode, the linear tape speed is increased while the rotational speed of the rotary head is kept constant. Thus, not all information can be detected.

It is desirable to provide synchronous operation of the rotary head recorders during normal operation to within single sample accuracy. This allows the master and slave recorders to operate with a precise timing relationship to one another at normal operating speeds.

In the prior art, when multitrack recorders are "ganged" together to operate synchronously, one track of the master recorder is dedicated to providing synchronizing information to the slave recorders. Track dedication eliminates a potential recording track that could be used to record a digital audio information. Using the prior art, if two eight track digital audio recorders are operated synchronously, one track is dedicated to synchronizing information, leaving only fifteen digital audio recording tracks. Thus, to provide sixteen track capability in the prior art, three eight track digital audio recorders have to be used. This is both inconvenient and inefficient.

SUMMARY OF THE INVENTION

The present invention allows synchronous operation of multitrack recorders without sacrificing any potential recording track. Instead, synchronizing information is transmitted serially along with a master sample clock. The synchronizing information, or time clock, is included with the digital audio information in the tape format. This time clock represents an absolute sample count referred from the beginning of the tape.

A preferred embodiment of the present invention synchronizes the slave units to a master unit in four stages. In the first stage, the slave units phase lock their sample VCO to the master VCO. Next, the slave unit compares its own current time code value from its tape to the current received master time code to determine a time code difference. The slave examines the time code difference and adjusts its tape position (using fast-forward or rewind) so that the master and slave time code values are approximately equal (within 1 minute).

Next, the slave unit "shuttles" its tape until the time code difference is under one second. In the third stage, the slave's capstan motors are slowed down (or sped up) so that the slave and master units are within one drum revolution (960 samples) of each other. Finally, the slave unit adjusts its sample VCO frequency to skip individual samples until the master and slave units are synchronized to within a single sample ($1/48,000$ of a second).

The system can also be used to play in an offset synchronization mode, where the time code difference is kept at a fixed value.

BRIEF DESCRIPTION OF THE DRAWINGS

FIGS. 6(a) and 6(b) are flowcharts illustrating the control flow that occurs during synchronization.

DETAILED DESCRIPTION OF THE PREFERRED EMBODIMENT

A method for synchronously operating two or more rotary head digital audio tape recorders is described. In the following description, numerous specific details, such as number of tracks, interface protocols, etc., are described in detail to provide a more thorough description of the present invention. It will be apparent, however, to one skilled in the art, that the present invention may be practiced without these specific details. In other instances, well-known features have not been described in detail so as to not obscure the present invention.

Figure 1:
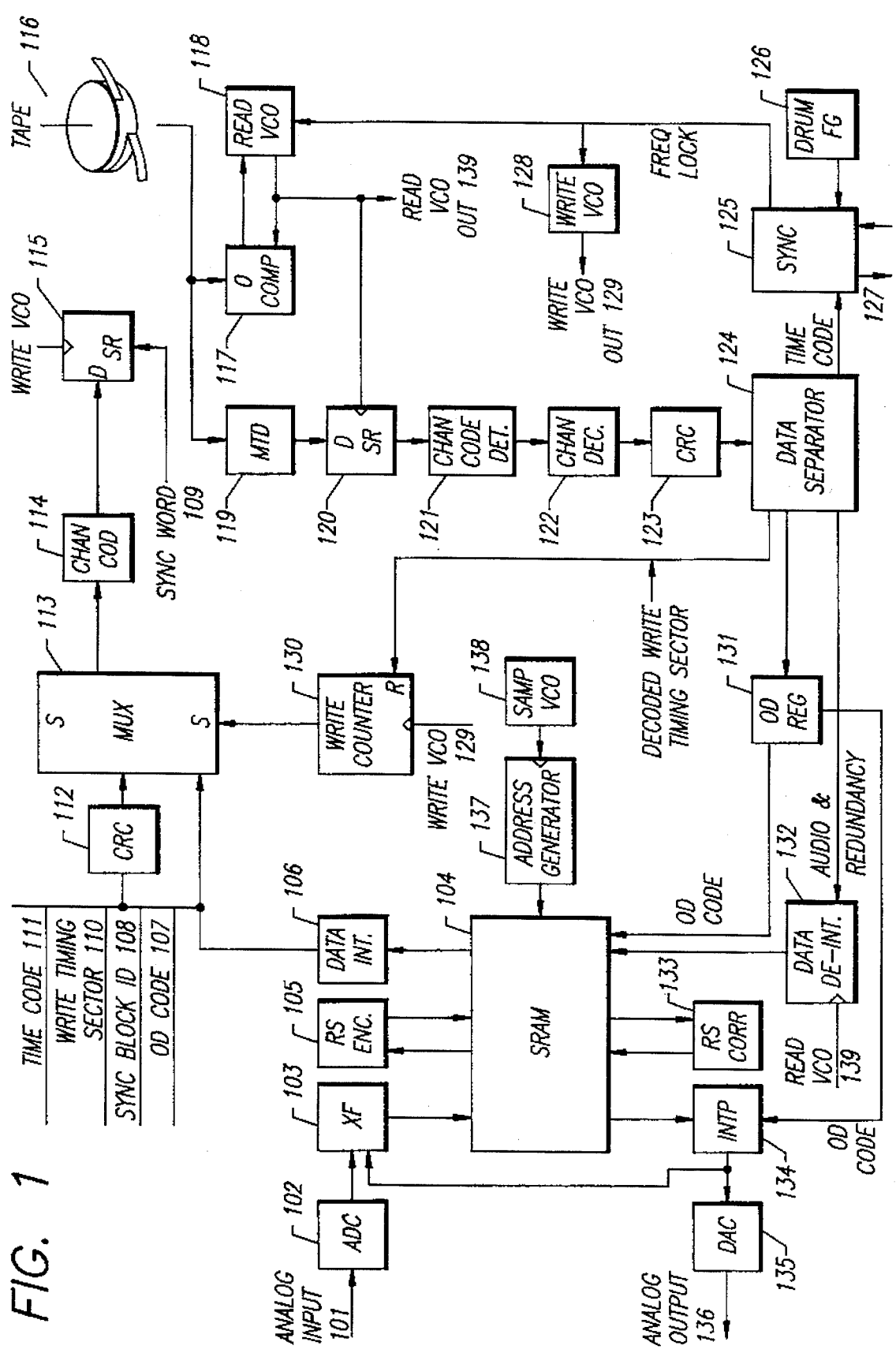
FIG. 1 is a block diagram of a digital audio recording system that may be used in conjunction with the preferred embodiment of the present invention.

A block diagram of a rotary magnetic head digital audio recording system that may be used in conjunction with the preferred embodiment of the present invention is illustrated in FIG. 1. To record a digital audio signal onto the magnetic tape, the analog audio signal 101 is sampled and quantized using analog-to-digital conversion system 102, where it is converted to digital audio samples. Alternatively, direct digital input 103 may be taken from a digital interface. The digital samples are fed into SRAM 104 through cross-fader 103. Cross-fader 103 receives and cross-fades information from interpolator 134 during "punch in/out" editing. Reed-Solomon encoder 105 retrieves the data stored in SRAM 104, supplies additional bits designed to protect the data against errors, and returns it to SRAM 104. SRAM 104 is coupled to address generator 137, which is clocked by sample VCO 138. The incoming samples are interleaved by data interleaver 106 to reduce the effects of burst errors on subsequent replay and error correction. Data interleaver 106 retrieves the data from SRAM 104 and feeds it into MUX 113 as well as CRC block 112. Reading the memory at a higher rate than it is written performs time compression.

CRC block 112 takes as input the interleaved data samples from block 106, overdub code 107, sync block ID 108, write timing sector 110, and time code 111. The output of CRC block 112 is coupled to MUX 113, and is comprised of CRC protection based on the inputs to CRC block 112. MUX 113 transmits CRC protection, interleaved data samples, overdub code 107, sync block ID 108, write timing sector 110, or time code 111 to channel coder 114, based on the output of write counter 130. Write counter 130 controls the formatting of the magnetic tape. The blocks are then converted into a channel code by channel coder 114, which combines the data with clock information. Channel coder 114 modulates the signal from 8 to 10 bit words so as to have a minimum DC content, and is coupled to shift register 115 along with sync word 109. Shift register 115 is clocked by write VCO 128, and provides an encoded digital audio data signal to to the rotary heads 116 via a rotary transformer to make the binary recording, which leaves the tape track with a pattern of transitions.

In one embodiment, the rotary drum turns at 3000 revolutions per minute, so one revolution takes 20 msec. Thus, each frame recorded on the tape contains 20 msec of audio data. In order to record, for example, a 48 kHz sample rate per channel, 960 samples must be stored for each channel.

Upon playback, the transitions on the tape track induce pulses in the read head, which are used to re-create the recorded waveform. This detected signal is fed to phase comparator 117 and to multiple transition detector 119. Phase comparator is coupled to read VCO 118, and provides phase information, based on the transition information detected on the tape, that controls the phase of read VCO 118. The read VCO output 139 is coupled to a 10-bit shift register 120 and to de-interleave block 132. Multiple transition detector 119 is coupled to shift register 120.

Shift register 120 is coupled to channel code detector 121. Channel code detector determines the validity of each 10-bit word received from shift register 120. Channel code detector 121 is coupled to channel code demodulator 122, which demodulates the data stream from 10-bit words to 8-bit words. These 8-bit words are fed to CRC error detection block 123, and then into data separator 124.

Data separator 124 determines the nature of the digital data, and provides this decoded information to the rest of the read circuitry. Data separator 124 separates the time code 111 and provides this to sync block 125. Sync block 125 is also coupled to drum frequency generator 126. Sync block 125 receives and transmits time code information through time code port 127, and controls synching operations among multiple digital audio recorders. Drum frequency generator 126 provides a 20 msec pulse to sync block 125 that is generated by rotating drum 116. Sync block 125 provides a frequency lock signal to both write VCO 128 and read VCO 118. Of course, read VCO 118 still must be phase locked using phase comparator 117.

Data separator 124 provides decoded write timing sector signal 110 to the reset input of write counter 130. Write counter 130, clocked by write VCO output 129, is reset after every occurrence of the write timing sector, that is, after every drum revolution.

Data separator 124 provides decoded overdub code 107 to SRAM 104 through overdub register 131. Overdub register 131 keeps track of the most recent overdub code detected in each audio channel. Data separator 124 provides audio and redundancy (digital audio samples, sync block ID's, Reed-Solomon redundancy) to de-interleave block 132 where, in addition to time-expanding the recording, functions to remove any wow and flutter due to head-to-tape speed variations. De-interleave block 132 provides the digital information to SRAM 104 in its proper order, and is clocked by read VCO output 139. Reed-Solomon correction block 133 retrieves the stored digital information, corrects it, if necessary, and returns it to storage. Interpolator 134 retrieves the corrected information from SRAM 104, and provides it to cross-fader 103 and digital-to-analog converter 135. Interpolator 134 is also coupled to overdub register 131. The reproduced analog audio output 136 is outputted from DAC block 135. Alternatively, the digital recording may be transmitted to another digital device via an interconnection between the machines in the digital domain.

The high bandwidth required to effectively record a digital audio signal necessitates a high tape speed. Rotary head recorders achieve a high bandwidth as a result of high relative head-to-tape speed. Media recorded using a rotary head can achieve 60,000 flux transitions/inch, about the same as stationary head recording, but track density may reach 2,000 tracks/inch, or about 10 times that of stationary head recording. Data transfer rates of 1 to 4 Mbytes/second are obtained, as the rotary head records the digital audio data onto the tape using a technique called helical scanning. In helical scanning, two or more electromagnetic heads are positioned on a head cylinder. The head cylinder is rotated at a speed (e.g., 3,000 revolutions/minute) that allows the use of a lower tape speed while still maintaining a high relative head-to-tape speed. As shown in FIG. 1, the tape is helically wrapped around a portion of the cylindrical drum.

Figure 2:
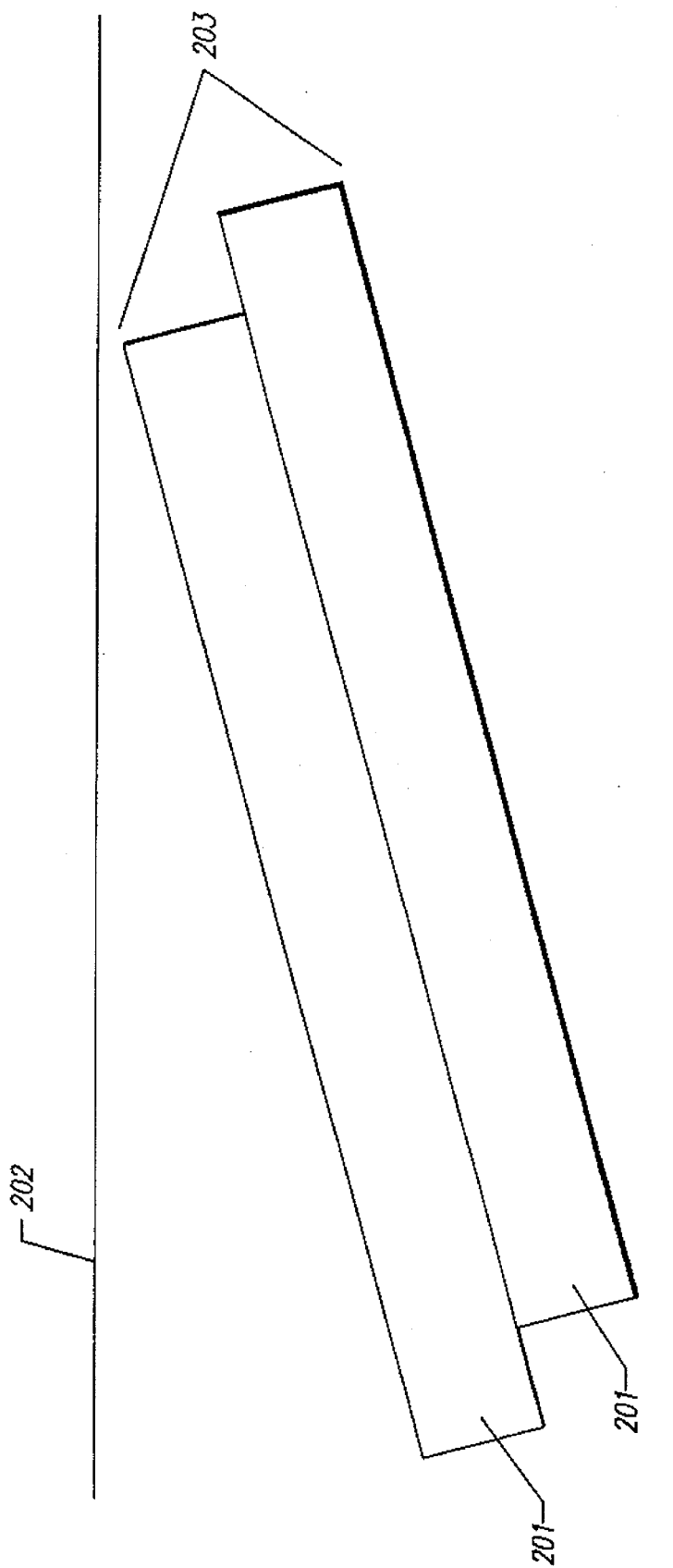
FIG. 2 illustrates the helical scanning tracks created by a rotary magnetic recording head.

Helical scanning records diagonally aligned tracks onto the tape. Because the tape is guided past the heads at an angle, each recorded track is placed diagonally across the tape width. FIG. 2 illustrates the diagonal tracks created by helical scanning. Each of the two write heads on the cylinder alternately lays down a track 201 onto the tape 202. Each pair of tracks 203 represents a specified amount of audio signal.

The present invention provides a method for synchronously operating two or more rotary head digital audio tape recorders to within single sample accuracy. The present invention may be used without having to dedicate a separate timing track on the master tape. The present invention allows synchronous operation of multitrack recorders without sacrificing any of the recording tracks. Instead, synchronizing information is encoded onto the tape with the digital audio information, allowing synchronization to within 1/48,000 of a second. In the preferred embodiment, each unit's audio information is synchronized to well under one sample period.

The master and slave units are synchronized using a tape format that includes a 32-bit time code value. However, the present invention may be used with any recording system that generates an absolute sample count (time code).

Figure 3:
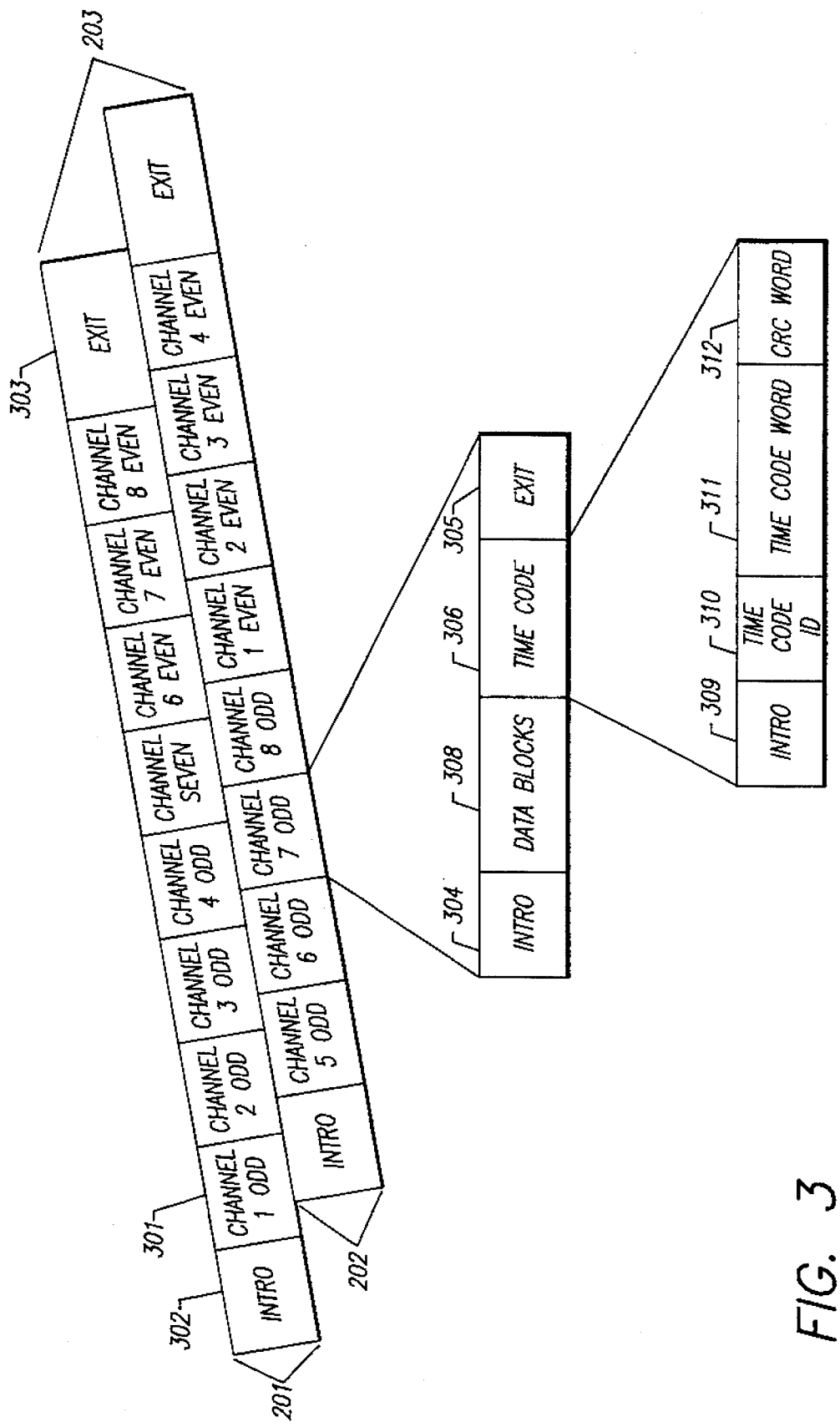
FIG. 3 illustrates a tape format that may be used in conjunction with the preferred embodiment of the present invention.

A tape format that includes time code that may be used in conjunction with the present invention is described in co-pending U.S. Pat. No. 5,321,561, entitled "Format For Recording Digital Audio Onto Magnetic Tape with Enhanced Editing and Error Correction Capability," issued Jun. 14, 1994, and assigned to the Assignee of the present invention. An example of a tape format for use with the preferred embodiment is illustrated in FIG. 3. Each channel 301 of audio samples is comprised of an intro 304, an exit 305, a time code block 306, and a plurality of sync blocks 308. Each time code block 306 is further divided, and is comprised of an intro 309, a time code ID 310, a time code word 311, and a check word 312. Each channel 301 within a single frame 203 contains the same time code word 311. In FIG. 3, eight interleaved channels 301 of digital audio information are recorded onto the tape. Thus, sixteen identical time code words 311 are recorded within each frame 203.

In the preferred embodiment, each time code block 306 is comprised of an 8-bit sync intro 309, an 8-bit time code block ID 310, a 32-bit time code word 311, and another 32-bit CRC check word 312. The lower 5 bits of the time clock block ID 419 are set equal to 30 to indicate that the 32-bit word is time code information and not digital audio data, as is contained in data blocks 308. The upper 3 bits of the time code block ID 419 represent the channel 301 that the time code block 306 is associated with, numbered from 0 to 7.

The time code word 311 is incremented after each revolution of the rotary recording head 116. During playback, the read head decodes the time code information along with the other digital data recorded on the tape. Each frame recorded on the tape can be precisely located simply by specifying to the read system the time code word 311 of the desired tape location. Further, as the time code value is incremented from rotation to rotation, by an amount equal to the number of audio samples represented by each rotation, by inference, each audio sample is associated with a unique time code value.

Additionally, because the same 32-bit time code word 311 is recorded 16 times for each frame 203, the recorder is able to detect time code even while operating in a high-speed "shuttle" mode where it can only detect a few channels per frame. In the "shuttle" mode, the linear tape speed is increased while still maintaining contact between the rotary drum and the tape. The speed of the rotary drum is kept the same as during normal operation. In the preferred embodiment, the linear tape speed is ten times faster in the "shuttle" mode than during normal playback.

In "shuttle" mode, the rotating heads do not read all of the digital information recorded on the tape because the rotating heads are scanning too slow to maintain immediate synchronization with the tape. However, using the tape format of the present invention, the rotary heads only need to detect one error-free time code word 311 out of the sixteen available time code words included in each frame 203 to correctly identify the current time code word.

The time code word 311 is read from the tape and stored internally. The digital audio system automatically increments the time code word 311 after every revolution of the rotary drum and uses this automatically incremented value as a check when reading the time code word of the next frame. In the preferred embodiment, the time code word is incremented once by 960 audio samples every rotation. If the digital audio system is unable to read the time code information from the tape (possibly due to a media dropout or an obstruction), the digital audio system increments by 960 the stored time code word after the next drum revolution and looks for the time code information in the subsequent frame. If the digital audio system is unable to detect any time code information on the tape after a certain number of drum revolutions (possibly because the tape is unformatted), the system generates an error. The user is notified of the system's inability to detect time code information, and is instructed to correct the problem (e.g., format the tape).

When digital audio recorders are synchronized, the drum and capstan of each recorder are phase locked, and the tape position of each recorder is the same. That is, each slave recorder is reading (or writing) the same audio sample at the same time as the master recorder.

Figure 4:
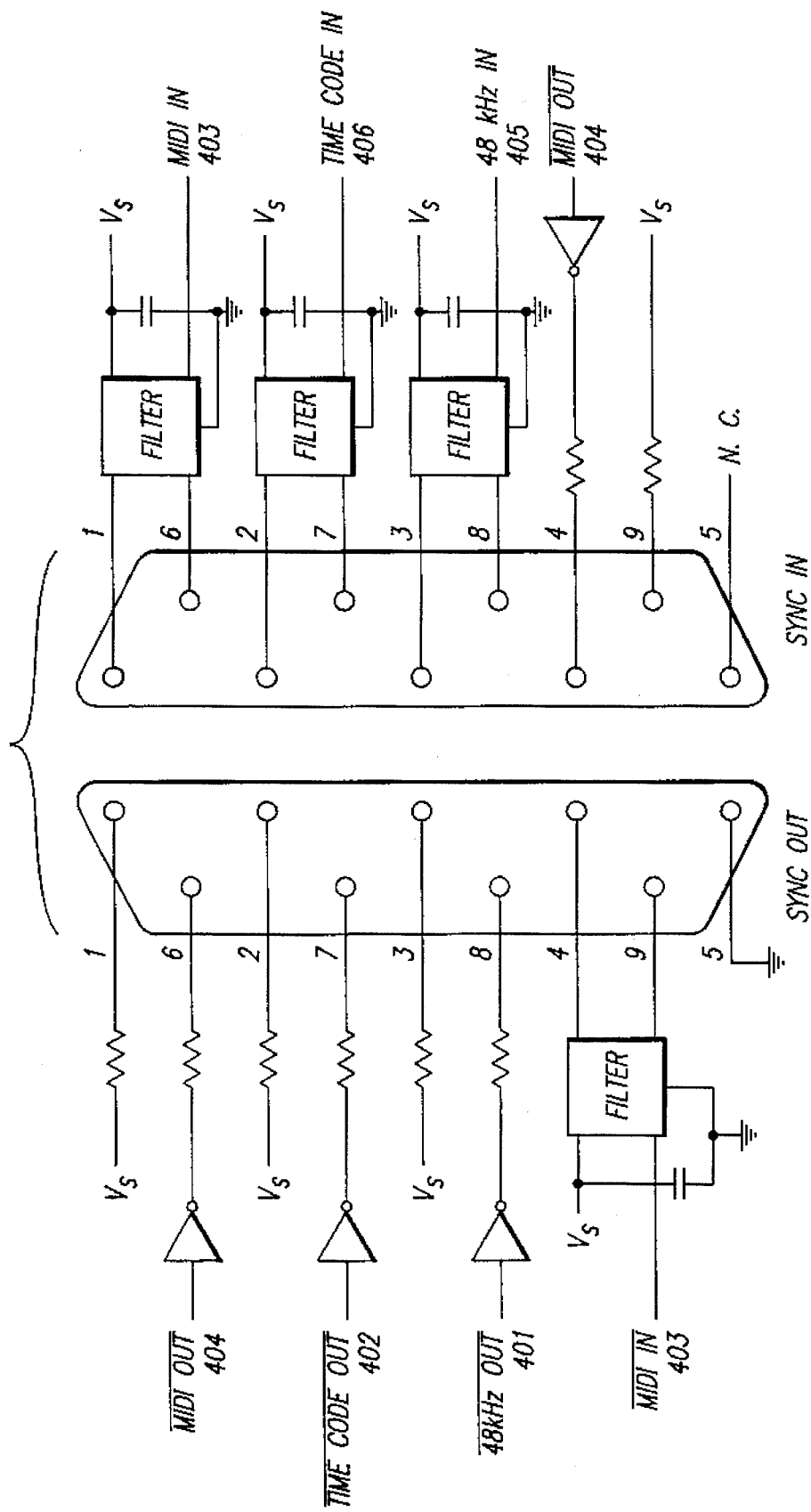
FIG. 4 is a flowchart illustrating the control flow of the preferred embodiment of the present invention.

In the preferred embodiment, each digital audio recorder is equipped with "Sync In" and "Sync Out" connections. The pin-out of each of these connections is shown in FIG. 4. The Sync Out connector provides a 48 kHz clock 401, time code signal 402, MIDI in 403, and MIDI out 404 connections. The 48 kHz clock 401 is generated by the designated master recorder. The time code signal 402 is a serial stream of information that represents the absolute audio sample count since the beginning of the tape. One bit of time code information is transmitted through the Sync Out connector during each 48 kHz clock pulse. The MIDI in and MIDI out pins are used to transmit and receive messages between recorders using standard MIDI protocol. The Sync In connector receives the signals generated at the Sync Out connector. The Sync In connector includes a 48 kHz clock input 405, a time code input 406, as well as MIDI in and MIDI out connectors 403 and 404.

In the preferred embodiment, up to 16 digital audio recorders may be connected and operated synchronously. However, for the sake of clarity in the following operating description, the operation of only two synchronized recorders is discussed. The Sync Out of a first (master) recorder is connected to the Sync In of a second (slave) recorder. If more than two recorders are to be synchronized, the Sync Out of the second recorder is connected to the Sync In of the third recorder, and so on, so that each additional recorder is connected serially to the preceding recorder.

On power up, the master recorder conducts an initialization procedure over its MIDI communication connection. During this procedure, the master recorder transmits a message from its Sync Out MIDI connectors inquiring as to the location and status of other recorders. When a first slave recorder receives the initial master recorder status message over its Sync In MIDI connector, it transmits a response message back to the master recorder. The master recorder, upon receipt of this response, assigns a number to the responding recorder, and then re-transmits its status message. The first slave recorder, having already been assigned a number, ignores the re-transmitted master message and passes the message on through its own Sync Out connection to the next connected recorder. The second slave recorder responds and is assigned a different number by the master recorder. This initialization procedure continues until the master recorder has assigned a unique number to all connected slave recorders. To avoid confusion when multiple recorders are connected, a slave recorder is designed to respond only to specific requests directed to that particular recorder from the master recorder. The assignment of unique numbers to each slave recorder facilitates communication.

Figure 5:
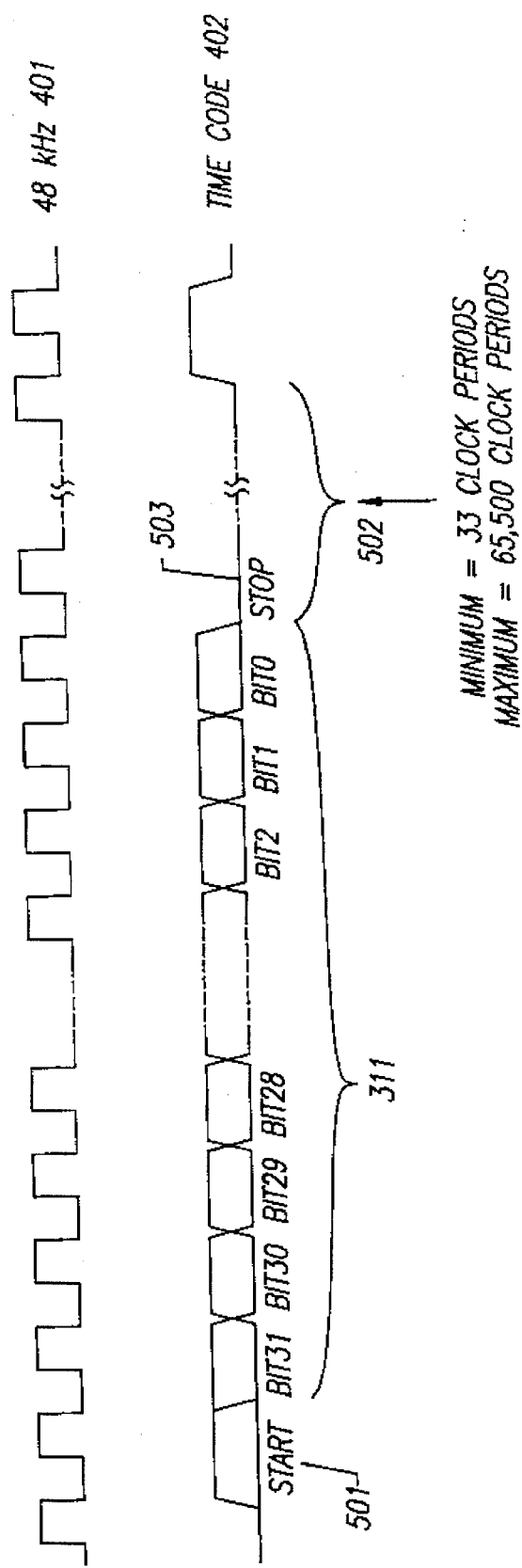
FIG. 5 illustrates waveforms of the clock and time code signal.

The waveforms of the 48 kHz clock 401 and the time code signal 402 are illustrated in FIG. 5. The time code format begins with a single start bit 501 that is set to a logical value of one. Each of the time code word's 32 bits are transmitted serially, one bit for each 48 kHz dock pulse. The time code word 311 is terminated with a string of stop bits 502 (logical zero). In the preferred embodiment, the stop bits 502 may be as few as 33 zeros and as many as 65,500 zeros. Because it takes 33 bits to transmit the time code word 311, the time code word must begin with a logical one, after receiving 33 consecutive zeros the read logic waits for the next occurrence of a one to signify the beginning of the next time code word.

The preferred embodiment allows recorders to be synchronized with single sample accuracy. The 48 kHz clock 401 is provided by the master recorder. Thus, each sample represents 1/48,000 of a second worth of audio information. Similarly, each recorder is synchronized within 1/48,000 of a second.

The time code word 311 is initialized to zero at the beginning of the tape. The time code word 311 represents the absolute sample count referenced from the beginning of the tape. In the preferred embodiment, the time code is not incremented after the recording of each audio sample. Instead, after each revolution of the rotary magnetic head, the time code word 311 is increased by the number of audio samples recorded during that rotation. In the preferred embodiment, 960 samples are recorded onto the tape during each revolution of the rotary drum. The time code 311 is incremented by 960 after every drum revolution. Thus, although each data block 308 with a single frame 203 contains the same time code word 311, each of the 960 samples recorded within frame 203 implicitly has a unique time code value assigned to it.

The time code value that is transmitted over the Sync Out connector is referenced to the sample occurring simultaneously with the first stop bit 503. That is, because the time code word 311 is transmitted serially over the span of 33 sample clock pulses, 33 additional samples pass while the time code is transmitted, one for each 48 kHz clock pulse. To avoid confusion, the time code word 311 is referenced to stop bit 503. Because a sample occurs once for every clock pulse, the absolute sample count for a particular sample may be calculated by taking the most recently transmitted time code word 311, and adding to it the number of clock pulses that have occurred since the transmission of stop bit 503.

Once the master recorder is set to operate in playback mode, the preferred embodiment synchronizes every connected slave recorder to the master recorder. To establish single sample synchronization, the slave recorder compares the master's 48 kHz clock 401 to its own sample VCO 138, and speeds up or slows down the sample VCO 138 until phase lock is achieved between the two 48 kHz clocks. The sample VCO 138 controls, among other things, the speed of rotation of the recording drum. Thus, once phase lock is established, the drums of the master and slave recorders are rotating at the same speed and in phase with one another.

Additionally, the rotating drum generates a pulse signal equal in frequency to the rotational frequency of the drum. In the preferred embodiment, the drum rotates 50 times per second, so the drum pulse generator (drum p.g.) generates a 20 msec signal. The drum frequency is compared to a 20 msec linear pulse recorded on the edge of the tape. This pulse is placed on the tape during formatting and detected by a separate stationary head. The capstan speed is adjusted so that the 20 msec drum p.g. pulse and the 20 msec linear pulse are in phase.

After phase-locking its drum to the 48 kHz clock and its capstan to the linear pulse on the tape, the slave recorder then begins a four stage procedure designed to correctly position its tape so that the master and slave recorder read the same audio sample at the same time. In the first stage, the sync controller of the slave recorder compares the master time code it receives over its Sync In connector to its own time code read from its tape to determine how far apart the sample count of the recorders are. To accomplish this comparison the master time code word is fed into a 32 bit shift register, and additional 48 kHz clock pulses occurring after the stop bit 503 are counted using a 16 bit counter. The slave time code is also inputted to a 32 bit shift register with additional clocks counted using a 16 bit counter. The 16-bit counters are cleared upon receipt of the next stop bit 503. Each 32 and 16 bit word is separated into twelve bytes containing 8 bits each. Because a new sample occurs during every 48 kHz clock pulse, the current sample count may be obtained by adding the time code stored in the 32-bit shift register to the current count stored in the 16 bit counter. Using low-cost microprocessors, it typically takes longer than one 48 kHz clock period to read and compare twelve latches. Therefore, the values in the shift registers and counters will continue to change as the latches are read and compared, resulting in an inaccurate computation. To avoid this, the sync controller transmits a microcode command to simultaneously "freeze" the values in the latches while the master and slave sample counts are compared. This "freeze" command loads the current master and slave sample counts to facilitate comparison.

The slave time code plus the slave offset stored in the 16 bit counter is subtracted from the master time code plus the master offset stored in the other 16 bit counter to establish a time code difference. This time code difference is equal to the number of audio samples that the slave recorder is ahead of or behind the master recorder. Because the master and slave sample VCO's are phase locked (and, consequently, the master and slave drums), the time code difference remains constant until a tape adjustment is made. Based upon the absolute value of the calculated time code difference, the slave recorder determines which of four possible adjustments are to be made to establish synchronization.

In the preferred embodiment, the tape may be transported at three different speeds. During playback (or record), the tape is transported at a nominal speed. During "scan" or "shuttle" mode, the tape is transported approximately ten times faster than in "normal" playback mode. Finally, in a fast-forward/rewind mode, the tape is transported approximately twenty times faster than in playback mode. During playback and scan modes, the drum remains in contact with the tape, although the capstan is disengaged from the tape while scanning. Because the drum remains in contact, the recorder is able to detect time code information from the tape during scanning. However, in fast-forward/rewind mode, the tape is unthreaded, transported, and then re-threaded onto the drum. Thus, in fast-forward/rewind mode, the recorder is unable to read time code information from the tape.

After computing the time code difference, the slave recorder repositions the tape using the most time-efficient transport methods. There is some time overhead in using fast-forward/rewind mode associated with unthreading and re-threading the tape (approximately 4 seconds), and a shorter time overhead in scan mode associated with disengaging and re-engaging the capstan (approximately 1 second). For large time code differences (>>1 minute), the fast-forward/rewind mode is the most time-efficient transport method. However, because of the overhead trade-off, at some point it is more economical to use the scan modes instead. In the preferred embodiment, if the time code difference is greater than 1 minute (2,880,000 samples), the slave recorder advances or rewinds the tape using the fast-forward/rewind mode. On the other hand, if the time code difference is between 1 second and 1 minute (48,000 and 2,880,000 samples), the slave recorder advances or rewinds the tape using the scan mode. These values are given by way of example only, and will change depending upon the exact tape transport methods available (and associated time overheads) in the recording system used.

As an example of how the preferred embodiment operates, if the initial computed time code difference were equal to 3,034,000 samples, the slave recorder would advance its tape using the fast-forward/rewind mode, since the time code difference is greater than 2,880,000 samples. The slave recorder calculates the amount of fast-forwarding required based on a tach pulse received from the supply reel of the slave tape cartridge. This calculation compensates for the varying hub diameter due to different amounts of tape present on the supply reel. Upon completion of the calculated fast-forwarding and resumption of the play mode, the slave recorder re-reads and compares the current master and slave time codes, and computes a new time code difference.

At this point, if the tach pulse calculation is done accurately, the new time code difference should be under 2,880,000 samples. If not, the tape is advanced or rewound in fast-forward/rewind mode once again. If, however, the time code difference is less than 2,880,000 samples, but greater than 48,000 samples (one revolution of the drum), the slave recorder operates in a second stage, and the tape is advanced or rewound in scan mode. In scan mode, because the drum maintains contact with the tape, the slave recorder is able to continue reading time code from the tape. In playback mode, one 20 msec linear pulse occurs during a single drum revolution. In scan mode, approximately ten linear pulses occur during a single drum revolution. In the second stage, the time code difference is divided by the number of samples occurring within a single revolution (960, in the preferred embodiment). The result is equal to the number of linear pulses (or, equivalently, the number of flames 203) that the slave recorder is ahead of or behind the master recorder. While scanning, the slave recorder counts the number of detected linear pulses and drum revolutions, and stops scanning once the system determines that the master and slave recorders are on the same data frame 203. Unfortunately, because of motor inertia, scan mode inaccuracies, capstan re-engagement overhead, and the fact that the master tape continues to run during this process, scanning may result in, but does not guarantee, precise, single sample synchronization.

The slave recorder continues to advance/rewind the tape, using either stage one or stage two transport methods, until the time code difference is less than or equal to one second. At this point, the slave recorder uses a "skip track" mode. The present invention may, of course, be used with values other than one second, depending on the transport accuracy and associated time overheads of the recording system used. In skip track mode, the time code difference is divided by the number of samples per drum revolution (960) to determine the number of drum revolutions that separate the master and slave recorders. Because the time code difference in skip track mode is less than or equal to one second, the number of revolutions separating the recorders in the preferred embodiment will be less than or equal to 50. During a single revolution of the rotary head, 960 samples are recorded in a pair of helical tracks onto the tape. In skip track mode, the recorder separation may be represented by a certain number of track pairs and samples. For example, if the time code difference in stage three is 25,567 samples, this represents 26 tracks, 607 samples in the preferred embodiment (26×960+ 607= 25,567).

In the third stage, the slave recorder adjusts the capstan speed so that the master and slave recorders are on the same track pair or, equivalently, on the same drum revolution. To accomplish this, the slave recorder first disables the normal locking mechanism that locks the 20 msec linear pulse on the tape to the drum pulse generator. Next, the slave recorder either speeds up or slows down its capstan, keeping track of the number of linear pulses and drum pulses that occur, until the slave recorder is on the proper track pair. In the example above, the slave capstan would be sped up until 26 more linear pulses occur than drum pulses, at which point the capstan is again locked. In the preferred embodiment, the speed of the capstan may be increased or decreased by approximately 25%.

In the fourth stage, the master and slave time codes are again read and compared to determine a current time code difference. Ideally, after stages one, two and three, the slave recorder should be on the same drum revolution as the master recorder, but not necessarily on the same audio sample. In other words, the slave recorder is off by a number of samples less than 960. If this is not the case, the slave recorder is again adjusted using fast-forward/rewind mode, scan mode, or skip track mode, until the recorders are within 960 samples of each other. In stage four, the slave recorder enters a "skip samples" mode. In the skip samples mode, the phase locking mechanism used to lock the slave recorder's sample VCO 138 to the incoming master 48 kHz clock 401 is disabled, and the sample VCO is sped up or slowed down until the slave recorder is on the same sample as the master recorder, at which point the sample VCO phase locking mechanism is re-engaged.

In the preferred embodiment, during "skip sample" operation, a flip-flop is docked by the master 48 kHz clock 401 and the slave sample VCO 138 is connected to the flip-flop data input. After the sample VCO is sped up or slowed down, every time the slave recorder skips an extra sample with respect to the master recorder, the flip-flop output changes from high to low and back to high again. The flip-flop output is used to send an interrupt to the microprocessor, instructing the microprocessor to decrement the current time code difference by one for every interrupt received. When the time code difference is equal to one sample, a latch is set that instructs the slave recorder to re-engage the phase locking mechanism for the sample VCO on the next flip-flop transition.

Once the sample VCO is again phase locked to the 48 kHz clock, the slave recorder reads and compares the master and slave time codes to determine if they are equal. If they are not equal, the slave recorder adjusts using one or more of the four adjustment stages, as needed. If the time codes are equal, the slave recorders are synchronized to the master recorder, and the slave recorder turns on its audio circuitry.

When the slave and master machines are in sample lock, the tapes of both units may be played without losing synchronicity. If the master recorder is turned off, paused, fast-forwarded, rewound, or scanned, synchronization is re-initiated upon resumption of playback operation.

The present invention can also be used to play in an offset synchronization mode, where the slave unit's time codes are shifted from the master unit's time codes by a fixed number of samples.

Although the present invention may be used to format digital data encoded using any format, the preferred embodiment encodes the analog signal into digital information using the Non-Return-To-Zero-Inverted (NRZI) encoding scheme. In NRZI, a digital "one" is encoded as a transition from either a high logic level to a low logic level, or from a low logic level to a high logic level. A digital "zero" is encoded as the absence of a transition. Thus, the binary word "1101" is encoded as "transition-transition-no transition-transition."

In the preferred embodiment of the present invention, each channel of digital audio information contains a time code. The time code is recorded along with some synchronizing header, an identification word, and an error detection word, such as a CRC word. In one embodiment, the sync word and identification word are 8 bits each, while the time code and CRC word are 32 bits each.

In the preferred embodiment, the master and slave recorders are connected using a 9 pin DIN connector. The master recorder transmits its time code signal 402 to the slave recorder. Additionally, instructions concerning the precise relationship to be maintained with the master recorder may be transmitted over the MIDI out 403 connector. Each individual slave recorder may be instructed to maintain the same time code as the master recorder, or to maintain a precise timing offset from the master recorder. The slave recorder receives the master time code and synchronization instructions, and synchronizes based on this information.

Figure 6B:
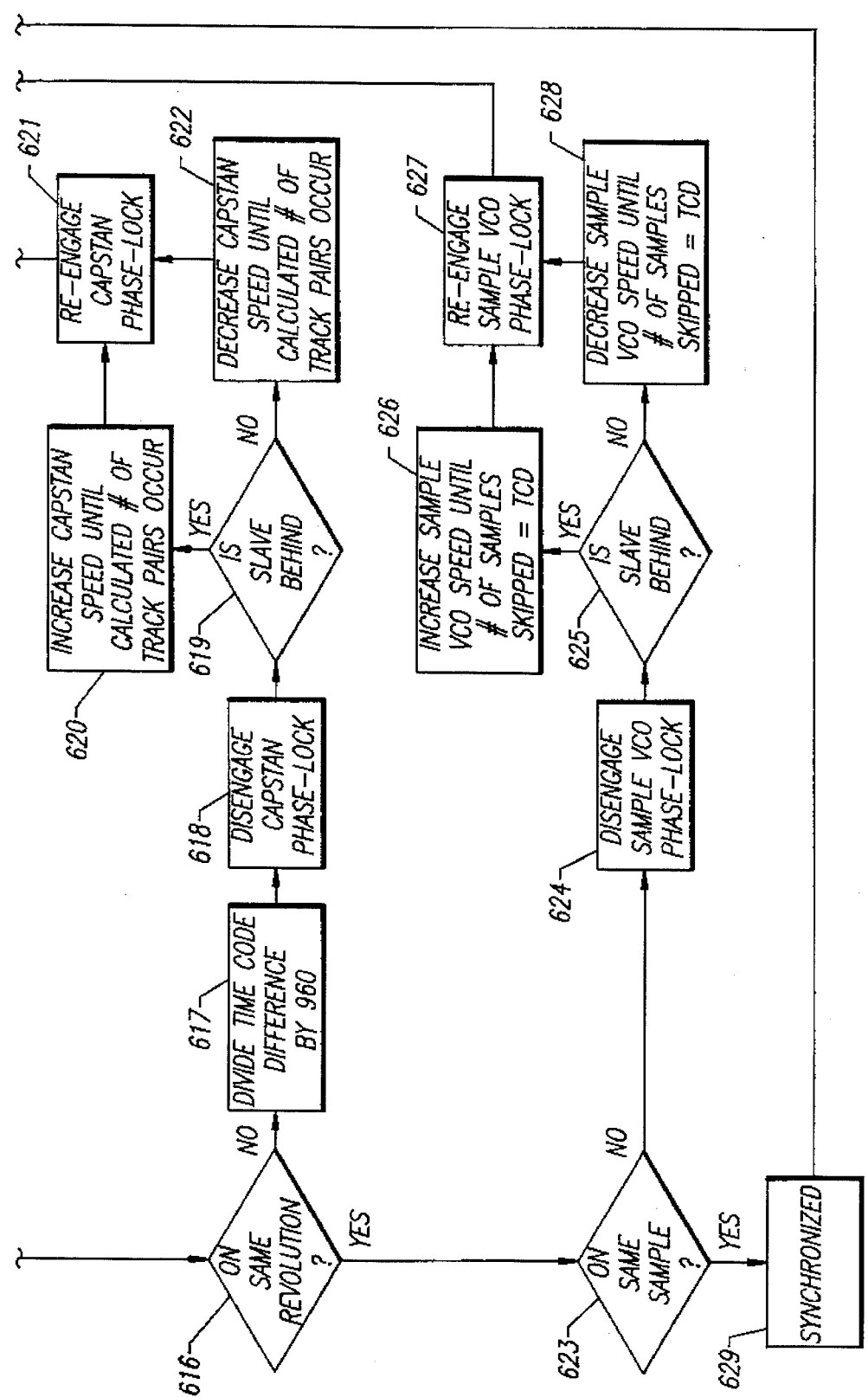

FIGS. 6(a) and 6(b) are flowcharts illustrating the control flow that occurs during synchronization. At step 601, the synchronization process begins. At step 602, the slave unit reads the time code from the slave recorder's magnetic tape. At step 603, the slave unit decodes the time code word 311 received from the master recorder. At step 604, the time code difference between the master and slave units is computed. At decision block 605, the question is asked, "Is the time code difference<1 minute?" If the answer to this question is no, the question is asked at decision block 606, "Is slave behind?" If the answer to this question is yes, the slave microprocessor computes the approximate fast forwarding required at step 607, and fast forwards the tape at step 608. Control then returns to step 602.

If the answer to the question posed at decision block 606 is no, then the slave microprocessor computes the approximate rewinding required at step 609, and rewinds the tape at step 610. Control then returns to step 602.

If the answer to the question posed at decision block 605 is yes, then at decision block 611, the question is asked, "Is the time code difference<1 second?" If the answer to this question is no at step 612, the time code difference is divided by 960 (the number of samples recorded during a single drum revolution). At decision block 613, the question is posed, "Is slave behind?" If the answer to this question is yes, than at step 614, the slave unit scans forward the calculated number of linear pulses at step 614, and control returns to step 602.

If the answer to the question posed at block 611 is yes, than at decision block 616, the question is asked, "On same revolution?" If the answer to this question is no, then the time code difference is divided by 960 at step 617. At step 618, the capstan phase-locking mechanism is disengaged. At decision block 619, the question is asked, "Is slave behind?" If the answer to this question is yes, the slave microprocessor increases the capstan speed at step 620, re-engages the capstan phase-locking mechanism at step 621, and control then returns to step 602.

If the answer to the question posed at decision block 619 is no, then the slave microprocessor decreases the capstan speed at step 622, re-engages the capstan phase-locking mechanism at step 621, and control then returns to step 602.

If the answer to the question posed at decision block 616 is yes, then at decision block 623, the question is asked, "On same sample?" If the answer to this question is no, the sample VCO phase-locking mechanism is disengaged at step 624. The question is asked at decision block 625, "Is slave behind?" If the answer to this question is yes, the sample VCO frequency is increased at step 626, the sample VCO phase-locking mechanism is re-engaged at step 627, and control returns to step 602.

If the answer to the question posed at decision block 625 is no, then the sample VCO frequency is decreased at step 628, the phase-locking mechanism is re-engaged at step 627, and control then returns to step 602. If the answer posed at decision block 628 is yes, then a synchronized flag is set at step 629, and control returns to step 602 to maintain synchronization.

Figure 7:
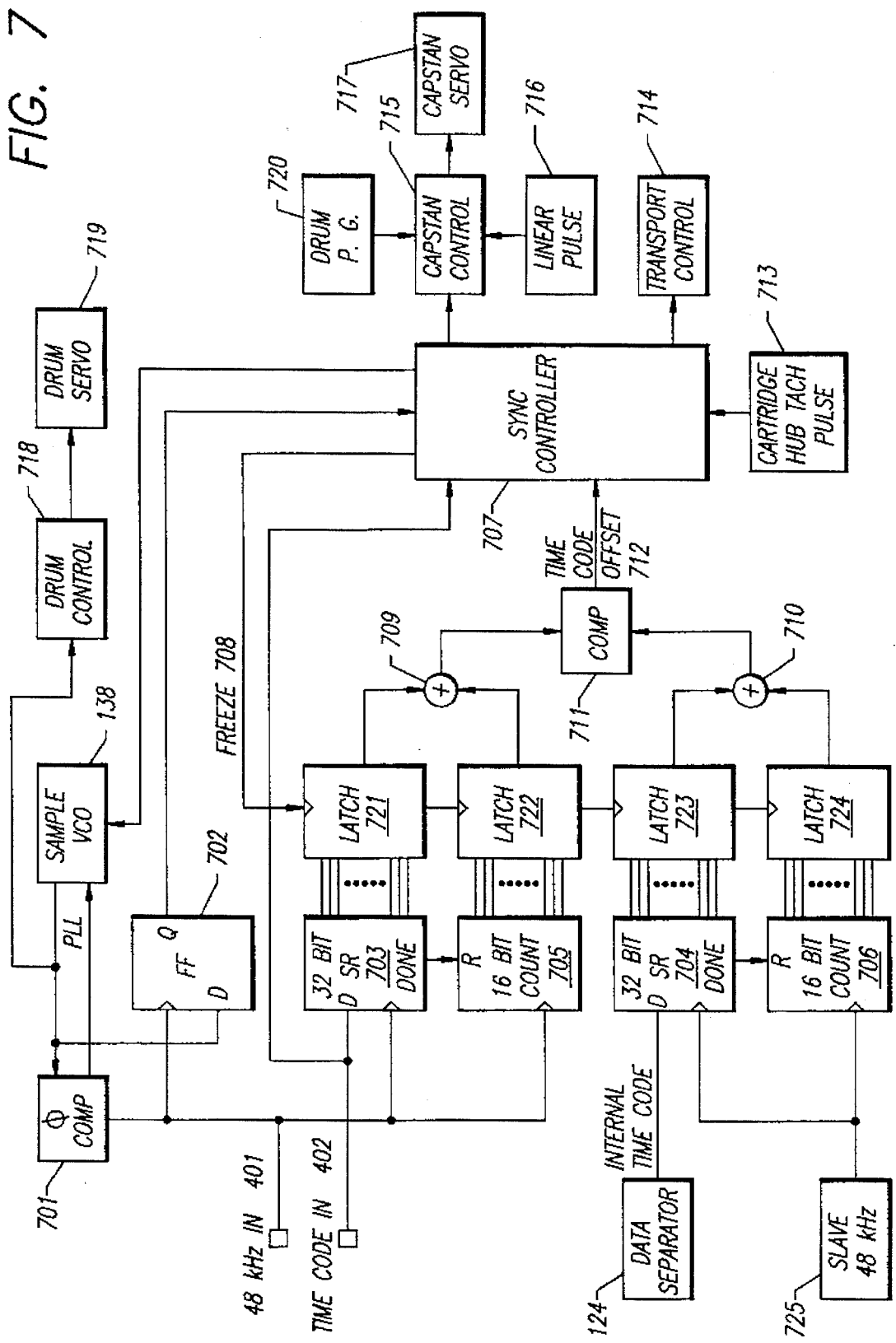
FIG. 7 is a block diagram of a circuit that may be used to implement the method of the present invention.

A block diagram of a circuit that may be used to implement the method of the present invention is illustrated in FIG. 7. Clock signal 401 is coupled to the phase comparator 701, and used to clock flip-flop 702, 32-bit shift register 703 and 16-bit counter 705. Slave 48 kHz clock 725 is used to clock 32-bit shift register 704 and 16-bit counter 706. Time code signal 402 is coupled to the data input of shift register 703 and to sync controller 707. Data separator 124 transmits time code information from the recorder's tape to the data input of shift register 704. The reset input of counters 705 and 706 are coupled to the DONE terminals of shift registers 703 and 704. When all 32 bits of a time code word have filled a shift register, the DONE connection of that shift register resets the associated 16-bit counter.

Latches 721, 722, 723, and 724 are connected to the outputs of shift register 703, counter 705, shift register 704, and counter 706, respectively. Sync controller 707 transmits a freeze signal 708 to latches 721–724. The six 8-bit bytes of latches 721 and 722 are added together by adder 709. The six 8-bit bytes from latches 723 and 724 are added together by adder 710. The results from adders 709 and 710 are compared by comparator 711, which computes a time code difference or offset 712. This offset 712 is coupled to sync controller 707.

Sync controller receives a tach pulse from cartridge hub tach pulse generator 713, and uses this pulse to compute the proper amount of fast-forwarding or rewinding during stage one operation. Sync controller 707 transmit stage one and two control signal to transport control 714. Sync controller 707 transmits stage three control signals to capstan control 715. Capstan control 715 is coupled to linear pulse generator 716 and drum pulse generator (drum p.g.) 720. Capstan control 715 locks the linear pulse generator 716 to the drum pulse generator 720, and transmits motor control signals to capstan servo 717.

Sample VCO 138 phase locks to the 48 kHz clock 401 using phase comparator 701. The output of flip-flop 702 is coupled to sync controller 707, and transmits an interrupt during stage four operation. Sample VCO 138 is coupled to sync controller 707, phase comparator 701 and drum control 718. Drum control 718 transmits control signals to drum servo 719 based on the sample VCO frequency to allow the system to skip samples during stage four operation.

Although this control flow is predicated on the premise that the slave and master units are to be synchronously locked to the same time code location on each tape, the present invention may be used to synchronously lock the slave and master units to any preselected time code relationship without departing from the spirit and scope of the present invention. For example, a slave unit could be synchronized to operate at a fixed position ahead or behind of the master unit, and several slave units could be synchronized with different fixed timing relationships to a single master unit.

Thus, a method for synchronizing two or more digital audio tape recorders is described.

We claim:

1. A method for synchronously operating a master recorder and a slave recorder, comprising the steps of:

(a) transmitting a master clock signal of said master recorder to said slave recorder;

(b) adjusting a sample rate of said slave recorder so that said sample rate is phase locked to said master clock signal;

(c) transmitting a current master time code $TC_M$ from said master recorder to said slave recorder;

(d) comparing said current master time code $TC_M$ to the current time code $TC_S$ of said slave recorder to compute a current time code difference $\Delta TC=(TC_M-TC_S-L_4)$, where $L_4$ is equal to a fourth limit;

(e) when $|\Delta TC|>L_1$, where $L_1$ is equal to a first limit, transporting the tape of said slave recorder in a first transport mode for a first calculated period, and returning to step (c);

(f) when $L_2<|\Delta TC|\leq L_1$, where $L_2$ is equal to a second limit, transporting the tape of said slave recorder in a second transport mode for a second calculated period, and returning to step (c);

(g) when $L_3<|\Delta TC|\leq L_2$, where $L_3$ is equal to a third limit, transporting the tape of said slave recorder in a third transport mode for a third calculated period, and returning to step (c);

(h) when $0<|\Delta TC|\leq L_3$, disengaging said sample rate phase lock so that said sample rate of said slave recorder is no longer phase locked to said master clock signal, adjusting said sample rate of said slave recorder until the number of samples skipped by said slave recorder is equal to $\Delta TC$, and returning to step (a);

(i) when $\Delta TC=0$, setting a flag indicating synchronization between said master and slave recorders.

2. The method of claim 1 wherein said first transport mode is an unthreaded fast-forward or rewind and said first calculated period is equal to the amount of time said slave recorder is required to be fast-forwarded or rewound in said first transport mode so that $|\Delta TC|\leq L_1$.

3. The method of claim 1 wherein said second transport mode is a threaded forward or reverse scan.

4. The method claim 1 wherein said third transport mode involves adjusting the speed of the tape capstan of the slave recorder.

5. The method of claim 1 wherein said third limit $L_3$ is equal to the number of digital audio samples recorded during one revolution of the rotary drum of said slave recorder.

6. The method of claim 1 wherein said fourth limit $L_4$ is equal to zero.

7. The method of claim 1 wherein said fourth limit $L_4$ is equal to a non-zero integer.

8. A method for synchronously operating a master rotary drum digital audio recorder and a slave rotary drum digital audio recorder, comprising the steps of:

(a) generating a slave pulse signal at the slave recorder equal in frequency to the rotational frequency of a rotary drum of said slave recorder;

(b) adjusting the speed of a tape capstan of said slave recorder so that said slave pulse signal is phase locked to a first periodic signal recorded on a tape of said slave recorder;

(c) transmitting a master clock signal of said master recorder to said slave recorder;

(d) adjusting a sample rate of said slave recorder so that said sample rate is phase locked to said master clock signal;

(e) transmitting a current master time code $TC_M$ from said master recorder to said slave recorder;

(f) comparing said current master time code $TC_M$ to the current time code $TC_S$ of said slave recorder to compute a current time code difference $\Delta TC=(TC_M-TC_S-L_4)$, where $L_4$ is equal to a fourth limit;

(g) when $|\Delta TC|>L_1$, where $L_1$ is equal to a first limit, transporting the tape of said slave recorder in a first transport mode for a first calculated period, and returning to step (e);

(h) when $L_2<|\Delta TC|\leq L_1$, where $L_2$ is equal to a second limit, transporting the tape of said slave recorder in a second transport mode for a second calculated period, and returning to step (e);

(i) when $L_3<|\Delta TC|\leq L_2$, where $L_3$ is equal to a third limit, transporting the tape of said slave recorder in a third transport mode for a third calculated period, and returning to step (e);

(j) when $0<|\Delta TC|\leq L_3$, disengaging said sample rate phase lock so that said sample rate of said slave recorder is no longer phase locked to said master clock signal, adjusting said sample rate of said slave recorder until the number of digital audio samples skipped by said slave recorder is equal to $\Delta TC$, and returning to step (c);

(k) when $\Delta TC=0$, setting a flag indicating synchronization between said master and slave recorders.

9. The method of claim 8 wherein said first transport mode is an unthreaded fast-forward or rewind and said first calculated period is equal to the amount of time said slave recorder is required to be fast-forwarded or rewound in said first transport mode so that $|\Delta TC|\leq L_1$.

10. The method of claim 8 wherein said second transport mode is a threaded forward or reverse scan.

11. The method claim 8 wherein said third transport mode involves adjusting the speed of the tape capstan of said slave recorder.

12. The method of claim 8 wherein said third limit $L_3$ is equal to the number of digital audio samples recorded during one revolution of the rotary drum of said slave recorder.

13. The method of claim 8 wherein said fourth limit $L_4$ is equal to zero.

14. The method of claim 8 wherein said fourth limit $L_4$ is equal to a non-zero integer.

15. A method for operating a slave rotary drum digital audio recorder in synchronicity with a master rotary drum digital audio recorder, comprising the steps of:

(a) generating a slave pulse signal at said slave recorder equal in frequency to the rotational frequency of a rotary drum of said slave recorder;

(b) adjusting the speed of a tape capstan of said slave recorder so that said slave pulse signal is phase locked to a first periodic signal recorded on a tape of said slave recorder;

(c) receiving at said slave recorder a master clock signal from said master recorder;

(d) adjusting a sample rate of said slave recorder so that said sample rate is phase locked to said master clock signal;

(e) computing a current time code difference $\Delta TC=(TC_M-TC_S-L_4)$, where $TC_M$ is equal to a current master time code, $TC_S$ is equal to a current slave time code, and $L_4$ is equal to a fourth limit, said current master time code $TC_M$ monitored only during this step (e), and not at all during steps (f), (g), (h) or (i);

(f) when $|\Delta TC|>L_1$, where $L_1$ is equal to a first limit, transporting the tape of said slave recorder a first calculated distance in a first transport mode, said first calculated distance equal to the amount of tape of said slave recorder required to be transported in said first transport mode so that $|\Delta TC| \leq L_1$, and returning to step (e);

(g) when $L_2 < |\Delta TC| \leq L_1$, where $L_2$ is equal to a second limit, transporting the tape of said slave recorder a second calculated distance in a second transport mode, and returning to step (e);

(h) when $L_3 < |\Delta TC| \leq L_2$, where $L_3$ is equal to a third limit, transporting the tape of said slave recorder a third calculated distance in a third transport mode, and returning to step (e);

(i) when $0 < |\Delta TC| \leq L_3$, transporting the tape of said slave recorder a fourth calculated distance in a fourth transport mode, and returning to step (e);

(j) when $\Delta TC=0$, setting a flag indicating synchronization of said slave recorder with said master recorder.

16. A method for operating a slave rotary drum digital audio recorder in synchronicity with a master rotary drum digital audio recorder, comprising the steps of:

(a) generating a slave pulse signal at said slave recorder equal in frequency to the rotational frequency of a rotary drum of said slave recorder;

(b) adjusting the speed of a tape capstan of said slave recorder so that said slave pulse signal is phase locked to a first periodic signal recorded on a tape of said slave recorder;

(c) receiving at said slave recorder a master clock signal from said master recorder;

(d) adjusting a sample rate of said slave recorder so that said sample rate is phase locked to said master clock signal;

(e) computing a current time code difference $\Delta TC=(TC_M - TC_S - L_4)$, where $TC_M$ is equal to a current master time code, $TC_S$ is equal to a current slave time code, and $L_4$ is equal to a fourth limit, said current master time code $TC_M$ monitored only during this step (e), and not at all during steps (f), (g), (h) or (i);

(f) when $|\Delta TC| > L_1$, where $L_1$ is equal to a first limit, transporting the tape of said slave recorder a first calculated distance in a first transport mode, and returning to step (e);

(g) when $L_2 < |\Delta TC| \leq L_1$, where $L_2$ is equal to a second limit, transporting the tape of said slave recorder a second calculated distance in a second transport mode, said second calculated distance equal to the amount of tape of said slave recorder to be transported in said second transport mode so that $|\Delta TC| \leq L_2$, and returning to step (e);

(h) when $L_3 < |\Delta TC| \leq L_2$, where $L_3$ is equal to a third limit, transporting the tape of said slave recorder a third calculated distance in a third transport mode, and returning to step (e);

(i) when $0 < |\Delta TC| \leq L_3$, transporting the tape of said slave recorder a fourth calculated distance in a fourth transport mode, and returning to step (e);

(j) when $\Delta TC=0$, setting a flag indicating synchronization of said slave recorder with said master recorder.

17. A method for operating a slave rotary drum digital audio recorder in synchronicity with a master rotary drum digital audio recorder, comprising the steps of:

(a) generating a slave pulse signal at said slave recorder equal in frequency to the rotational frequency of a rotary drum of said slave recorder;

(b) adjusting the speed of a tape capstan of said slave recorder so that said slave pulse signal is phase locked to a first periodic signal recorded on a tape of said slave recorder;

(c) receiving at said slave recorder a master clock signal from said master recorder;

(d) adjusting a sample rate of said slave recorder so that said sample rate is phase locked to said master clock signal;

(e) computing a current time code difference $\Delta TC=(TC_M - TC_S - L_4)$, where $TC_M$ is equal to a current master time code, $TC_S$ is equal to a current slave time code, and $L_4$ is equal to a fourth limit, said current master time code $TC_M$ monitored only during this step (e), and not at all during steps (f), (g), (h) or (i);

(f) when $|\Delta TC| > L_1$, where $L_1$ is equal to a first limit, transporting the tape of said slave recorder a first calculated distance in a first transport mode, and returning to step (e);

(g) when $L_2 < |\Delta TC| \leq L_1$, where $L_2$ is equal to a second limit, transporting the tape of said slave recorder a second calculated distance in a second transport mode, and returning to step (e);

(h) when $L_3 < |\Delta TC| \leq L_2$, where $L_3$ is equal to a third limit, transporting the tape of said slave recorder a third calculated distance in a third transport mode, said third calculated distance is equal to the amount of tape of said slave recorder to be transported in said third transport mode so that $|\Delta TC| \leq L_3$, and returning to step (e);

(i) when $0 < |\Delta TC| \leq L_3$, transporting the tape of said slave recorder a fourth calculated distance in a fourth transport mode, and returning to step (e);

(j) when $\Delta TC=0$, setting a flag indicating synchronization of said slave recorder with said master recorder.

18. A method for operating a slave rotary drum digital audio recorder in synchronicity with a master rotary drum digital audio recorder, comprising the steps of:

(a) generating a slave pulse signal at said slave recorder equal in frequency to the rotational frequency of a rotary drum of said slave recorder;

(b) adjusting the speed of a tape capstan of said slave recorder so that said slave pulse signal is phase locked to a first periodic signal recorded on a tape of said slave recorder;

(c) receiving at said slave recorder a master clock signal from said master recorder;

(d) adjusting a sample rate of said slave recorder so that said sample rate is phase locked to said master clock signal;

(e) computing a current time code difference $\Delta TC=(TC_M - TC_S - L_4)$, where $TC_M$ is equal to a current master time code, $TC_S$ is equal to a current slave time code, and $L_4$ is equal to a fourth limit, said current master time code $TC_M$ monitored only during this step (e), and not at all during steps (f), (g), (h) or (i);

(f) when $|\Delta TC| > L_1$, where $L_1$ is equal to a first limit, transporting the tape of said slave recorder a first calculated distance in a first transport mode, and returning to step (e);

(g) when $L_2 < |\Delta TC| \leq L_1$, where $L_2$ is equal to a second limit, transporting the tape of said slave recorder a second calculated distance in a second transport mode, and returning to step (e);

(h) when $L_3 < |\Delta TC| \leq L_2$, where $L_3$ is equal to a third limit, transporting the tape of said slave recorder a third calculated distance in a third transport mode, and returning to step (e);

(i) when $0 < |\Delta TC| \leq L_3$, transporting the tape of said stave recorder a fourth calculated distance in a fourth transport mode, and returning to step (e), said fourth transport mode comprising the following steps:

(1) disengaging said sample rate phase lock so that said sample rate of said slave recorder is no longer phase locked to said master dock signal, (2) adjusting said sample rate of said slave recorder until the number of digital audio samples skipped by said slave recorder is equal to $\Delta TC$;

(3) receiving at said slave recorder a master clock signal from said master recorder; and (4) adjusting the sample rate of said slave recorder so that said sample rate is again phase locked to said master clock signal;

(j) when $\Delta TC=0$, setting a flag indicating synchronization of said slave recorder with said master recorder.

* * * * *